US005627362A

United States Patent [19]

Youngquist et al.

[11] Patent Number: 5,627,362
[45] Date of Patent: May 6, 1997

[54] PORTABLE LIGHT SOURCE UNIT FOR SIMULATING FIRES HAVING AN ADJUSTABLE APERTURE

[75] Inventors: Robert C. Youngquist, Cocoa; John S. Moerk, Titusville; James P. Strobel, Brandenton, all of Fla.

[73] Assignee: The United States of America as represented by the Administrator of the National Aeronautics and Space Administration, Washington, D.C.

[21] Appl. No.: 431,801

[22] Filed: May 1, 1995

[51] Int. Cl.[6] .................... G01J 1/32

[52] U.S. Cl. .................... 250/205; 250/229; 362/187

[58] Field of Search .................... 250/205, 559.1, 250/229, 233, 237 G, 231.14, 231.18, 236, 333–334, 495.1, 504 R, 504 H, 252.1 A, 343; 362/157, 187, 188, 192, 197, 276, 282, 802, 323

[56] References Cited

U.S. PATENT DOCUMENTS

| | | | |
|---|---|---|---|
| 1,965,947 | 7/1934 | Prouty . | |
| 2,613,313 | 10/1952 | Weeks . | |
| 3,136,890 | 6/1964 | Wain | 250/504 |
| 3,553,665 | 1/1971 | Trumble . | |
| 3,609,364 | 9/1971 | Paine . | |
| 3,659,043 | 4/1972 | Low et al. | 250/333 |
| 3,944,834 | 3/1976 | Chuan et al. . | |
| 4,112,335 | 9/1978 | Gonser | 315/241 R |
| 4,241,258 | 12/1980 | Cholin | 340/577 |
| 4,302,109 | 11/1981 | Davies | 250/237 R |
| 4,314,760 | 2/1982 | Hodge et al. | 250/237 R |
| 4,446,363 | 5/1984 | Lakin et al. . | |
| 4,529,881 | 7/1985 | Ceurvels et al. | 250/353 |
| 4,745,272 | 5/1988 | Andreatti, Jr. | 250/205 |
| 4,864,146 | 9/1989 | Hodges et al. | 250/504 R |
| 4,896,042 | 1/1990 | Humphreys | 250/504 R |
| 4,975,584 | 12/1990 | Benjamin et al. | 250/339 |
| 5,034,615 | 7/1991 | Rios et al. | 250/504 H |
| 5,056,097 | 10/1991 | Meyers | 372/38 |
| 5,171,086 | 12/1992 | Baloochi | 362/158 |

*Primary Examiner*—Que Le
*Attorney, Agent, or Firm*—William J. Sheehan; Beth A. Vrioni

[57] ABSTRACT

A portable, hand held light source unit is employed to check operation of fire detectors, such as hydrogen fire detectors. The unit emits radiation in a narrow band of wavelengths which are generated by the type of fire to be tested, but not by other light sources such as the sun or incandescent lamps. The unit can test fire detectors at different distances, and of different sensitivities. The intensity of the radiation emitted by the unit is adjustable for this purpose by means of a rotatable disk having a plurality of different sized apertures for selective placement between the light source and an output lens. The disk can also be rotated to a calibration position which causes a microprocessor circuit in the unit to initiate a calibration procedure. During this procedure, the lamp intensity is measured by a photodetector contained within the unit, and the microprocessor adjusts the lamp current to insure that its intensity remains within a preset range of values. A green and a red LED are mounted on the unit which indicate to an operator whether the calibration is successful, as well as the condition of the unit's battery power supply.

20 Claims, 6 Drawing Sheets

10

PORTABLE LIGHT SOURCE UNIT FOR SIMULATING FIRES HAVING AN ADJUSTABLE APERTURE

ORIGIN OF THE INVENTION

The invention described herein was made in the performance of work for the U.S. Government under a NASA contract, and is subject to the provisions of Public Law 96-517 (35 USC 202) in which the contractor has elected not to retain title.

BACKGROUND OF THE INVENTION

The present invention relates in general to a portable light source unit which is particularly suited for simulating a fire to test the operation of fire detectors.

Hydrogen fires present a significant danger during rocket launch preparations at the Kennedy Space Center. These types of fires are particularly hazardous if they occur during daylight hours because hydrogen burns with a flame that is virtually invisible to the naked eye. As a result of this potential hazard, the Kennedy Space Center has installed groups of special detectors at each launch pad which can detect the presence of a hydrogen fire. These detectors are specifically shortwave ultraviolet (UV) detectors which utilize a Hamamatsu ultraviolet detector tube to indicate the presence of radiation in the optical wavelength range from 180 nm to 240 nm. This spectral window is unique for within it, a hydrogen fire emits a small amount of radiation, while incandescent lamps and the sun emit no significant radiation, and the air is transmissive. Consequently, this spectral region is very favorable for monitoring hydrogen fires in air with a minimum possibility of false alarms.

Each launch pad utilizes about 60 hydrogen fire detectors in one of three configurations referred to as (−1), (−2) and (−3). A (−2) unit has an unmodified configuration designed to alarm off of a standard hydrogen fire (defined as the fire produced by burning $H_2$ flowing at 5 SLPM through a 1/16" orifice) at a distance of 24 feet. A (−1) unit is a (−2) unit with a screen mesh added to reduce sensitivity to the point where the unit will alarm off of a standard hydrogen fire at 15 feet. A (−3) unit has modified electronics added to increase the sensitivity such that it will alarm at a distance of 54 feet from a standard hydrogen fire.

Before flowing hydrogen at a launch pad, operations personnel check the performance of the hydrogen fire detectors with a hydrogen fire simulation device. In the past, the simulation devices have been simply a flashlight with an ultraviolet light source that emits UV radiation in the 180 nm to 240 nm wavelength range. To check the performance of the detectors, the operations person stands as close as is reasonable to the fire detector and aims the flashlight at it. If the detector unit alarms, the unit is considered operational, and if it does not, the unit is declared defective and is replaced.

This testing approach has two primary problems. First, the flashlight has no intensity adjustment and emits enough radiation to alarm the least sensitive (−1) unit at the maximum distance required, which is 50 feet. This is sufficient to cause some of the more sensitive (−2) units to arc and latch in an alarm state for up to 30 minutes when exposed at close distances. Second, the bulb intensity is never calibrated so the user has no method to determine whether a given bulb is deteriorating over time, or if a new bulb has a dramatically different emission intensity than an old bulb. This results in the likelihood that the performance of a detector will not be properly assessed if the bulb intensity changes significantly over time.

SUMMARY OF THE INVENTION

To overcome the aforementioned problems of the prior art hydrogen fire simulation devices, the present invention provides a portable light source unit for simulating hydrogen fires and other types of fires which incorporates both means for adjusting the intensity of the emitted radiation depending upon the type of fire detector to be tested and its distance away from the source unit, and means for calibrating the unit's light source to insure that its intensity remains constant over its lifetime.

In the preferred embodiment of the invention, the light source is a lamp contained within a housing having a window formed therein for emitting the lamp's radiation. A rotatable aperture disk selectively blocks a portion of the window with one of a plurality of different sized apertures which provide a corresponding plurality of discrete intensity levels. These permit an operator to select an intensity level based upon the type of detector being tested and its distance from the source unit. For calibration purposes, the rotatable aperture disk is movable to a position where it completely blocks the window. The lamp is then activated to illuminate a photodetector contained within the housing which measures the lamp's intensity. The measured intensity is compared to a range of desired intensities, and the current supplied to the lamp is modified accordingly to lock its intensity at a desired level. Means are also provided to indicate to an operator whether the lamp cannot be properly calibrated, and whether the unit's battery is weak or dead.

BRIEF DESCRIPTION OF THE DRAWINGS

The foregoing and other advantages and features of the present invention will become apparent from the following detailed description of a preferred embodiment thereof, taken in conjunction with the accompanying drawings in which.

DETAILED DESCRIPTION OF THE PREFERRED EMBODIMENT

Figure 1:
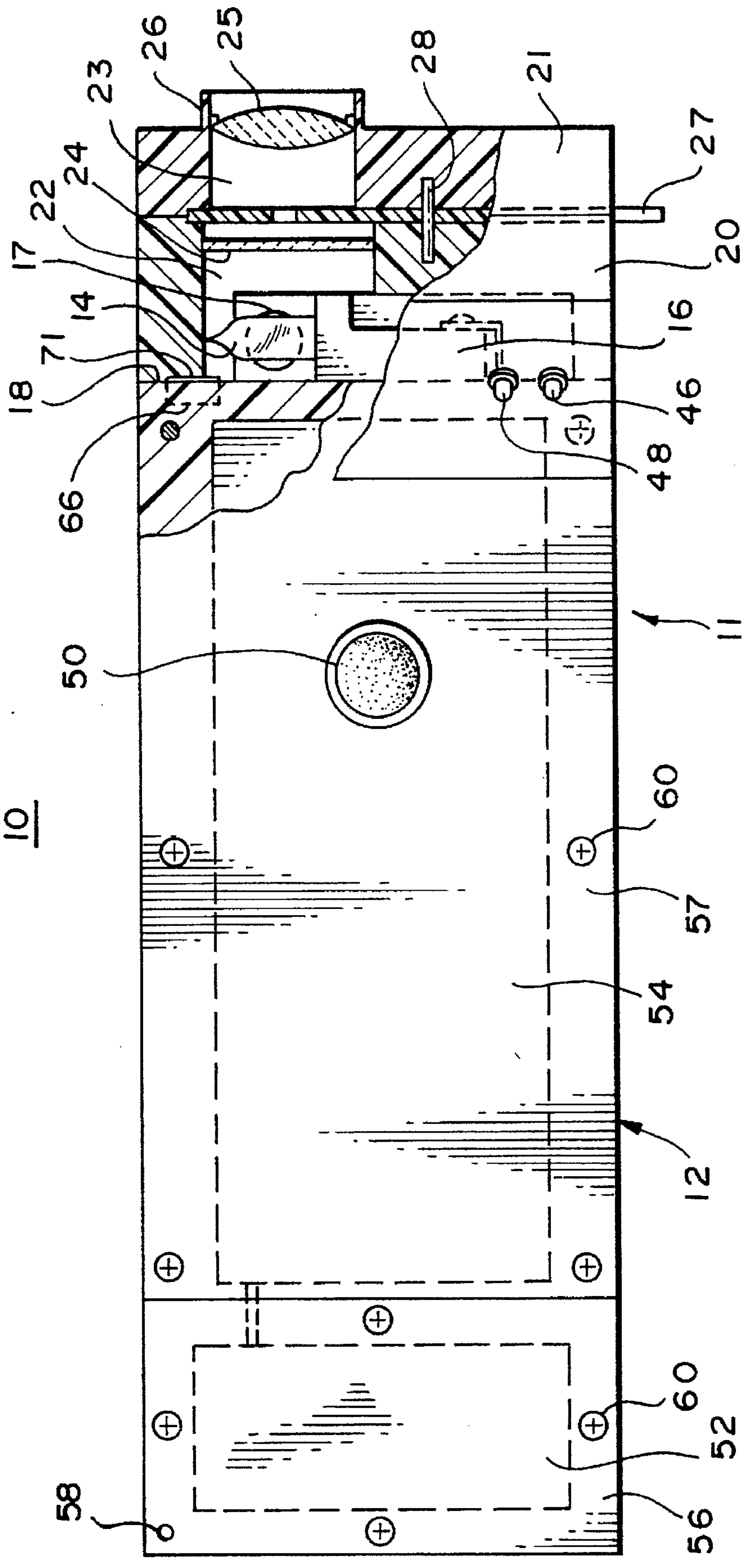
FIG. 1 is a top view of a housing for a portable light source unit which forms the preferred embodiment of the present invention, with a number of elements contained therein shown in phantom and a portion of the unit cut away to show some of the elements therein.
Figure 2:
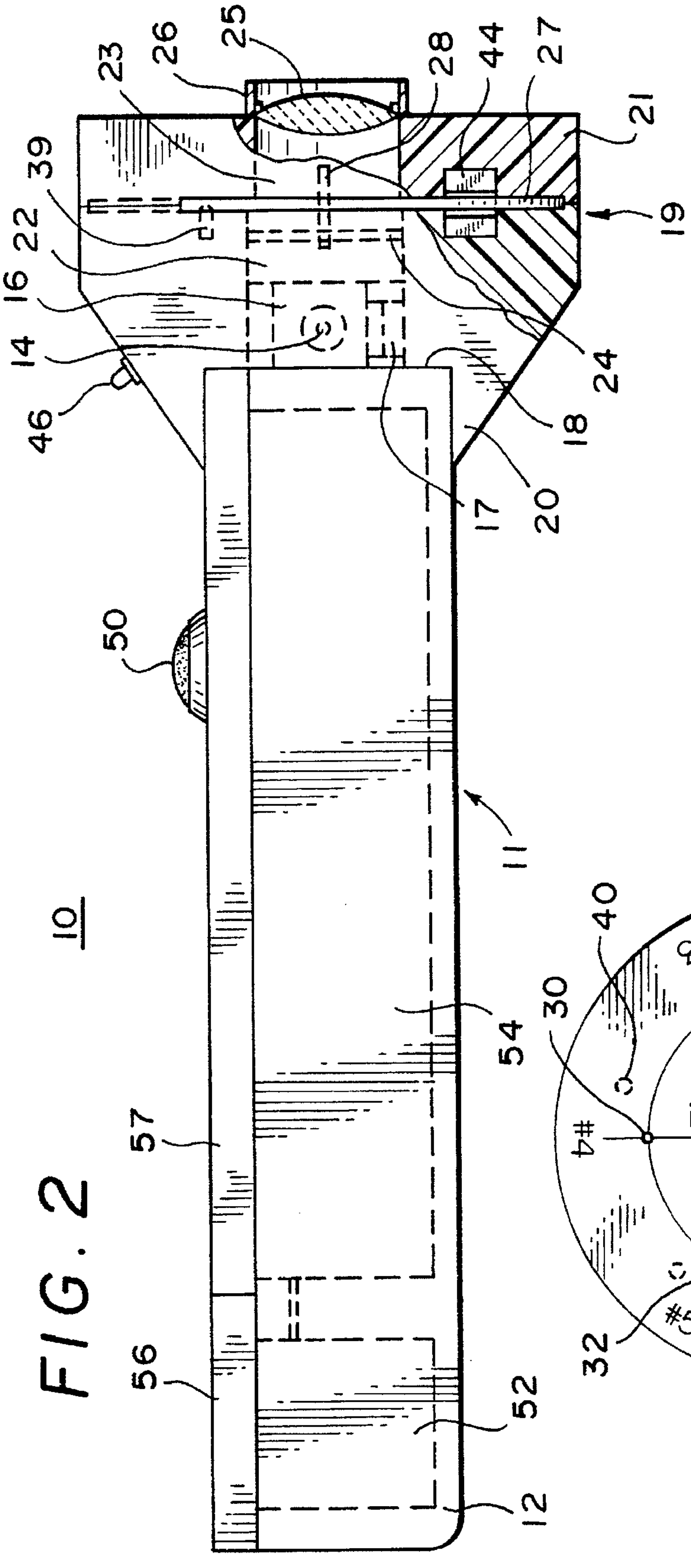
FIG. 2 is a side view of the housing of FIG. 1, again showing some elements contained therein in phantom and a portion of the unit cut away.

Turning now to a detailed consideration of the preferred embodiment of the present invention, FIGS. 1 and 2 illustrate a light source unit 10 which is employed for testing any desired type of fire detector, such as a hydrogen fire detector. Each type of fire to be simulated has a characteristic signature, i.e., generates radiation in a unique spectral window. In the case of a hydrogen fire simulator, the light source unit 10 is designed to emit variable intensity ultraviolet radiation in a spectral window of 180 nm to 240 nm. As discussed previously, a hydrogen fire emits a small amount of radiation within this spectral window, while other light sources, including incandescent lamps and the sun do not emit radiation within this window. As a result, the source unit 10 can be employed to simulate a hydrogen fire if it emits radiation only in this spectral window, and thus can be used to test the performance and operability of hydrogen fire detectors.

The unit 10 includes a sealed housing 11 which is preferably made from a light absorbing material, such as black delrin. The housing 11 includes an electrical component housing 12 which contains the numerous electrical components (discussed in greater detail below in conjunction with FIG. 4) that are employed to supply power to a light source comprising a lamp 14. The lamp 14 is secured in a lamp holder 16 mounted adjacent a photodetector 17 at a front end 18 of the component housing 12. In the case of a hydrogen fire simulator, the lamp 14 is preferably a small Krypton discharge lamp which produces the desired ultraviolet intensity. By way of example, this lamp can be part No. 002405-002 which is available from Hile Controls of Florida. The photodetector 17 is employed for calibration purposes as discussed in greater detail later in conjunction with FIG. 4.

The sealed housing 11 also includes a two-piece end cap 19 which is removably attached to the front end 18 of the component housing 12. The end cap 19 specifically includes a first generally triangular shaped piece 20 which is mounted to the front end 18 by a plurality of screws (not shown), and a second, front cover 21 which is mounted to the triangular shaped piece 20, also by a plurality of screws (not shown). An aperture 22 is formed in the triangular shaped piece 20 which is aligned with a similar aperture 23 formed in the front cover 21, and these permit radiation from the lamp 14 to be emitted from the unit 10.

A window 24, preferably made of sapphire, is removably positioned by friction and/or screws (not shown) in the aperture 22 of the triangular shaped piece 20 which acts as a seal to prevent moisture from getting into the housing 12 and possibly affecting performance of the electrical components contained therein. A short focal length lens 25 is mounted by any suitable means in a lens mount 26, which is press fit into the aperture 23 of the front cover 21. The short focal length lens 25 is also preferably made from sapphire, although it will be understood that both it and the window 24 could be made from any other suitable material as well. In addition, the lens 25 could be replaced with a reflective parabola like those used in conventional flashlights in order to reduce costs if desired. The short focal length lens 25 preferably has a diameter of approximately 1" and is necessary to project the illumination provided by the bulb 14 into a relatively narrow field of view, thus allowing the unit 10 to alarm the more sensitive fire detectors at distances as far away as 54 feet.

Figure 3:
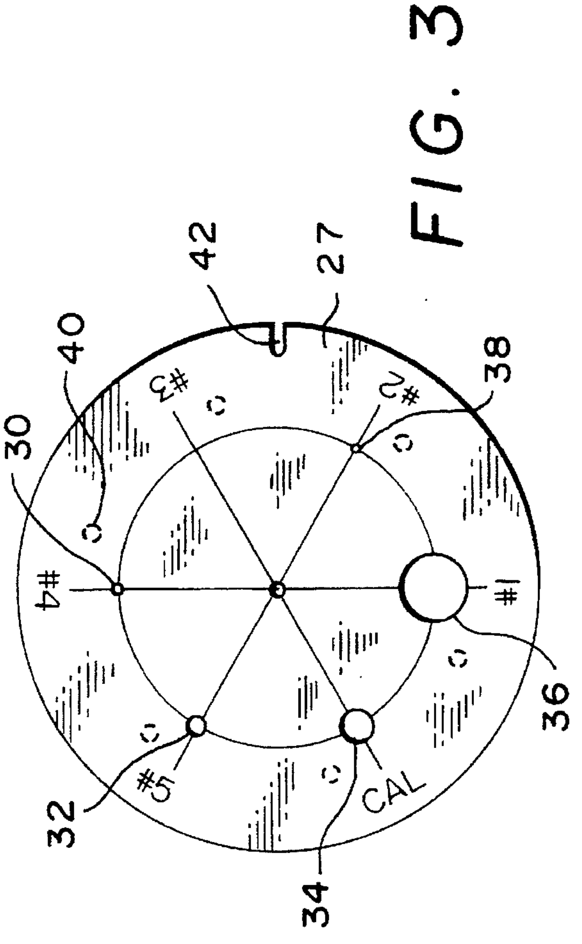
FIG. 3 is a front view of a rotatable aperture disk which is employed to select the relative intensity of the radiation emitted by the unit of FIGS. 1 and 2.

A key feature of the unit 10 is the provision of an aperture disk 27 which is rotatably mounted on an axle pin 28 projecting from the front end of the triangular shaped piece 20. As illustrated, a portion of the disk 27 is always positioned between the window 24 and the lens 25. The rotatable aperture disk 27 is more clearly illustrated in FIG. 3, and is separated into six sectors defining five positions for five different intensity levels and one for calibration. To provide the five different intensity levels, five different sized apertures labelled 30, 32, 34, 36 and 38 are positioned, one each, in five of the sectors. The remaining sector contains no aperture so that when the disk 27 is rotated to this position, it completely blocks the window 24 for calibration of the lamp 14 as discussed in greater detail below in conjunction with FIGS. 4 and 5. To hold the rotatable disk 27 in one of its six positions, a spring loaded set pin 39 is mounted in the front end of the triangular shaped piece 20 as illustrated in FIG. 2, which automatically projects into one of six detent holes 40 in the back of the disk 27 as it is rotated, each of which corresponds to one of the six positions.

In the specific application of the unit 10 as a hydrogen fire simulator, each of the five intensity settings of the disk 27 corresponds to the necessary intensity needed to alarm a specific type of Scientific Instrument shortwave UV hydrogen flame detector at a specific distance. The preferred embodiment of the unit 10 has been specifically designed to work with three different types of hydrogen flame detectors, referred to as (−1), (−2) and (−3). A (−2) unit is a standard, unmodified detector which is designed to alarm off of a standard hydrogen fire (defined as the fire resulting from burning $H_2$ flowing at 5 SLPM through a 1/16" orifice), at a distance of 24 feet or less. A (−1) unit is a (−2) unit modified with an added screen mesh to reduce sensitivity to the point where the unit will alarm off of a standard hydrogen fire at 15 feet or less. A (−3) unit is a (−2) unit which has modified electronics that increase the sensitivity so that it will alarm at a distance of 54 feet or less. The diameters of the apertures 30–38 in the disk 26 are chosen in the preferred embodiment to be 0.069", 0.110", 0.185", 0.404" and 0.040", respectively. These sizes result in the intensity of the UV radiation being emitted from the unit 10 to be the following for each of the five positions:

| Disk Position Setting | Intensity Relative to Intensity of a Standard $H_2$ Fire | Detector Distance And Type |
|---|---|---|
| 1 | 40% | 8 feet for (−1)<br>15 feet for (−2) |
| 2 | 100% | 15 feet for (−1)<br>24 feet for (−2)<br>54 feet for (−3) |
| 3 | 2.8x | 24 feet for (−1)<br>50 feet for (−2) |
| 4 | 13x | 50 feet for (−1) |
| 5 | 14% | 8 feet for (−2) |

When the rotatable aperture disk 27 is set to the calibration position, a small slot 42 near its peripheral edge lines up with an optical interrupter 44 that is mounted on the front end of the triangular shaped piece 20 (see FIG. 2). The optical interrupter 44 generates an electrical signal which is employed to cause the unit's electronics to initiate a calibration procedure as discussed in greater detail below in conjunction with FIGS. 4 and 5.

Returning now to FIGS. 1 and 2, first and second LEDs 46 and 48 are mounted on top of triangular shaped piece 20 which are used to signal different system conditions to the operator, including battery condition and calibration test results. The first LED 46 is preferably green, while the second LED 48 is preferably red. The operation of the LEDs 46 and 48 is discussed in greater detail later in conjunction with the operation of the unit 10. A momentary contact push button 50 is also mounted on top of the component housing 12 for actuating the unit 10 (also discussed in greater detail later).

The component housing 12 includes a small battery compartment 52 for reception of a conventional 9 volt battery or battery pack. A second, larger compartment 54 is provided for reception of the unit's electronic circuitry to be discussed next in conjunction with FIGS. 4 and 5. First and second covers 56 and 57 are removably attached to the component housing 12 with a plurality of screws 60 for permitting access to the battery compartment 52 and circuit compartment 54, respectively. As illustrated, the push button 50 is mounted on the circuit compartment cover 57. Finally, a small through hole 58 is formed in one corner of the component housing 12 for attachment of a carrying strap or tether to the unit 10.

Figure 4:
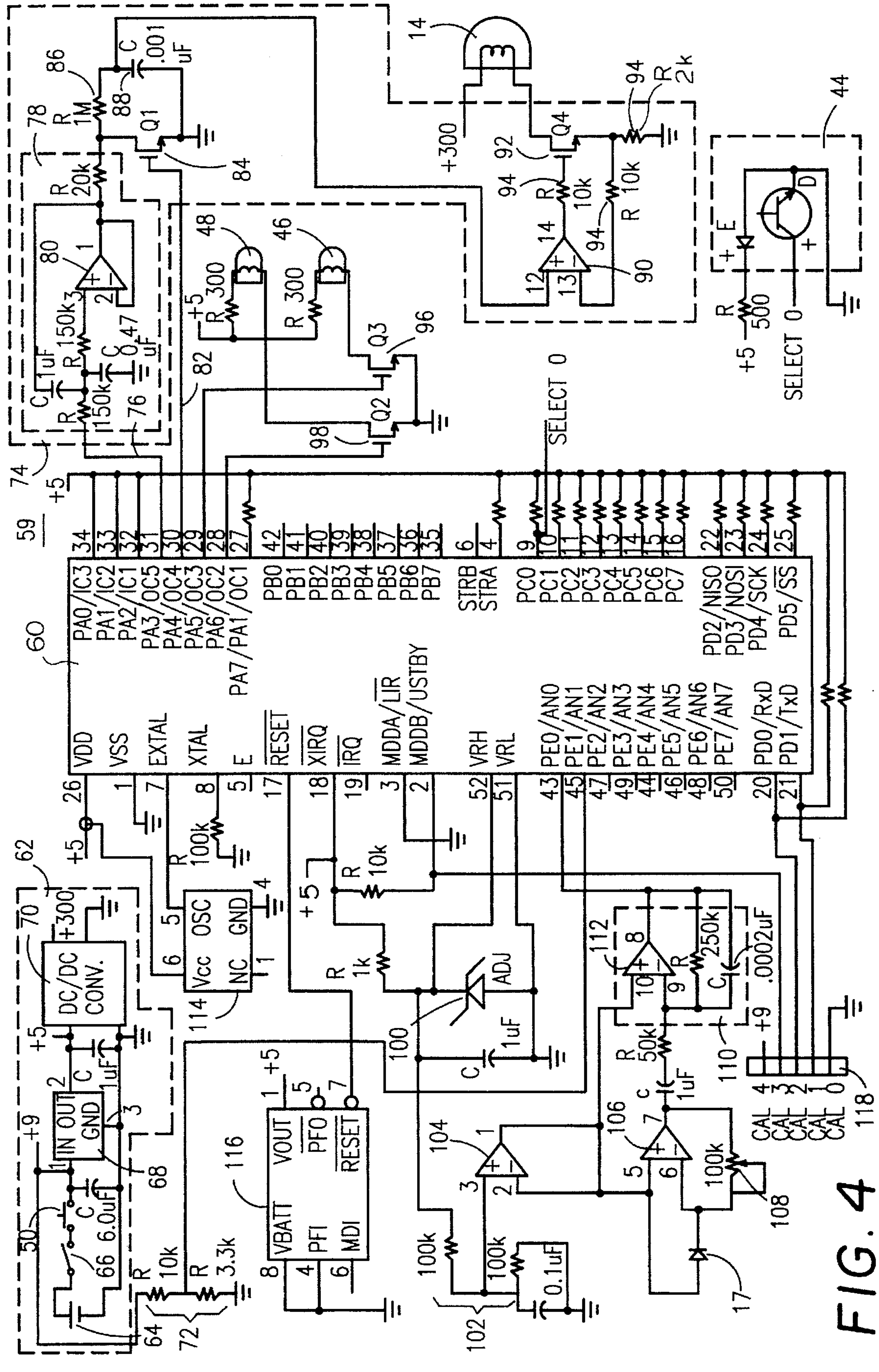
FIG. 4 is a block diagram of the microprocessor circuit employed to operate the unit of FIGS. 1 and 2.

Turning now to FIG. 4, a circuit 59 for operating the light source unit 10 is illustrated. The heart of the circuit 59 is a conventional 68HC11 microprocessor 60 which is essentially a microcontroller that generates outputs for actuating the lamp 14 and the LEDs 46 and 48 in response to various input signals.

The circuit 59 includes a power supply circuit 62 comprising a conventional 9 volt battery or battery pack 64, the push button actuation switch 50, a safety microswitch 66, a LM7805 5 volt regulator 68 and a 5 volt to 300 volt DC-DC converter 70. The push button switch 50 is used by the operator to either turn on or calibrate the lamp 14, while the safety microswitch 66 is open circuited when the triangular shaped piece 20 is removed to prevent an operator from coming into contact with the 300 volt output of the DC-DC converter 70. The position of the safety microswitch 66 is illustrated in FIG. 1, and it includes a spring loaded arm 71 which opens the switch when the triangular shaped piece 20 is removed from the component housing 12.

The 5 volt regulator 68 provides a 5 volt output for supplying power to the microprocessor 60 and the various other circuit elements which require it. A voltage divider 72 comprised of a first, 10K-ohm resistor and a second, 3.3K-ohm resistor in series is connected between the push button switch 50 and one of the analog inputs (pin 45) of the microprocessor 60 to supply the microprocessor with an analog voltage for monitoring the condition of the 9 volt battery 64. The operation of the microprocessor 60 in this regard is discussed in greater detail below.

The positive output from the DC-DC converter 70 is connected to one terminal of the lamp 14, while the second terminal for the lamp 14 is connected to a lamp control circuit generally indicated at 74. As is standard in a 68HC11 microprocessor, the microprocessor 60 includes a pulse width modulated output 76 (pin 31) which is connected to a low pass filter 78 that is constructed from a TLC27M9 op-amp 80 and associated resistors and capacitors. The low pass filter 78 averages the pulse width modulated output signal to obtain a lamp control voltage.

Another one of the microprocessor's control outputs 82 (pin 30) is connected to an IRF110 MOSFET 84. The MOSFET 84 is connected between the output of the low pass filter 78 and ground and allows the microprocessor 60 to switch the lamp control voltage to ground, thereby disabling the lamp 14. A 1M-ohm resistor 86 and a 0.001 μF capacitor 88 are connected across the MOSFET 84 to limit the on/off slew rate of the lamp 14.

Connected between the resistor 86 and the lamp 14 are another TLC27M9 op-amp 90, an IRF840 MOSFET 92, and a number of associated resistors 94. These elements are arranged so that the op-amp 90 is used in a transconductance mode to allow voltage control of the lamp current.

Additional outputs of the microprocessor 60 control operation of the first and second LEDs 46 and 48. In particular, the pin 29 output controls operation of an IRF110 MOSFET 96, which controls current flow to the first LED 46. Similarly, the pin 28 output of the microprocessor 60 is connected to another IRF110 MOSFET 98 controls current flow to the second LED 48.

The circuit elements which are employed by the microprocessor 60 to check and adjust calibration of the lamp 14 will now be described. The optical interrupter 44 includes an output labelled SELECT0 which is connected to one of the control inputs of the microprocessor 60 on pin 9. The SELECT0 output goes low when the optical interrupter 44 is lined up with the slot 42 in the disk 27, and causes the microprocessor 60 to initiate the calibration procedure.

An LM336 2.5 volt voltage reference circuit 100 is connected to the VRH and VRL inputs of the microprocessor 60 (pins 52 and 51, respectively), and is used to establish the high voltage reference for an A/D converter contained within the microprocessor 60. The low voltage reference, VRL, is tied to ground. The voltage reference circuit 100 is also connected to a voltage divider 102 which generates a 1.25 volt reference voltage that is fed into a TLC279 op-amp buffer 104. The photodetector 17 is connected across the inputs of another TLC279 op-amp 106 which converts the photodetector current to a voltage, this voltage being referenced to 1.25 volts by the op-amp 104. A trim pot 108 is connected across the minus input and output of the op-amp 106 which is employed to set the gain on the current-voltage conversion. The output of the current/voltage converter op-amp 106 is connected to a band pass filter 110 which is based on another TLC279 op-amp 112. This active filter AC-couples the photodetector signal relative to 1.25 volts, and filters out high frequency noise. The output from the band pass filter 110 is then fed into one of the analog inputs of the microprocessor 60 (on pin 43), and is employed to determine the intensity of the lamp 14 sensed by the photodetector 17.

The remaining circuit elements in FIG. 4 comprise conventional support circuitry for the microprocessor 60. These include an oscillator 114, a MAX690-Watchdog 116 10K-ohm pull-up resistors. A connector 118 is also provided to permit serial communication with the microprocessor 60 by an external I/O device for programming changes.

In the operation of the unit 10, an operator selects the appropriate position of the disk 27 for the distance and detector type to be tested, aims the unit 10 at the detector and holds down the push button 50. During this procedure, alignment of the unit 10 with the detector being tested is important. With the arrangement of optics in the unit 10 and the shape of the filament in the lamp 14, the projected field pattern is not circular, but is elliptical. The narrow field of view is in the vertical direction of the unit 10 so that holding the unit 10 with the push button 50 facing up makes the projected field sensitive to the unit's pitch, which is difficult for an operator to monitor while looking down at the unit 10. The preferable way to hold the unit 10 is therefore to hold it with its top facing to either side so that small misalignments to the left or right can be easily seen and corrected by the user, and the pitch is not as critical.

The green and red LEDs 46 and 48 serve multiple purposes. During normal operation when one of the five aperture positions of the disk 27 is selected, the green LED 46 will flash on and off to indicate that the condition of the battery 64 is okay. If the battery is weak, both the green and red LEDs 46 and 48 will be flashed, and if the battery 64 is very weak, i.e. dead, then only the red LED 48 will be flashed. The other function of the LEDs 46 and 48 is to indicate the results of a calibration test as discussed next.

At regular intervals, i.e. after suspicious results, long unused periods, and/or after 20 to 30 uses, the unit 10 should be recalibrated. This is done by selecting the calibration position on the disk 27 and holding down the push button 50. Both LEDs 46 and 48 will flash on and off at this time indicating that a calibration is in process. The lamp 14 is turned on and off and the microprocessor 60 sets the lamp's current to yield a preset intensity level as measured by the ultraviolet detector 17. If the preset intensity is reached, the microprocessor 60 stores the necessary operational data so that the lamp 14 will operate at this level during subsequent operations, and the green LED 46 will be flashed. If the microprocessor 60 cannot achieve the lamp intensity needed, usually due to degradation of the lamp, then the red LED 48 will be flashed. If this occurs, the lamp 14 should be changed.

Figure 5A:
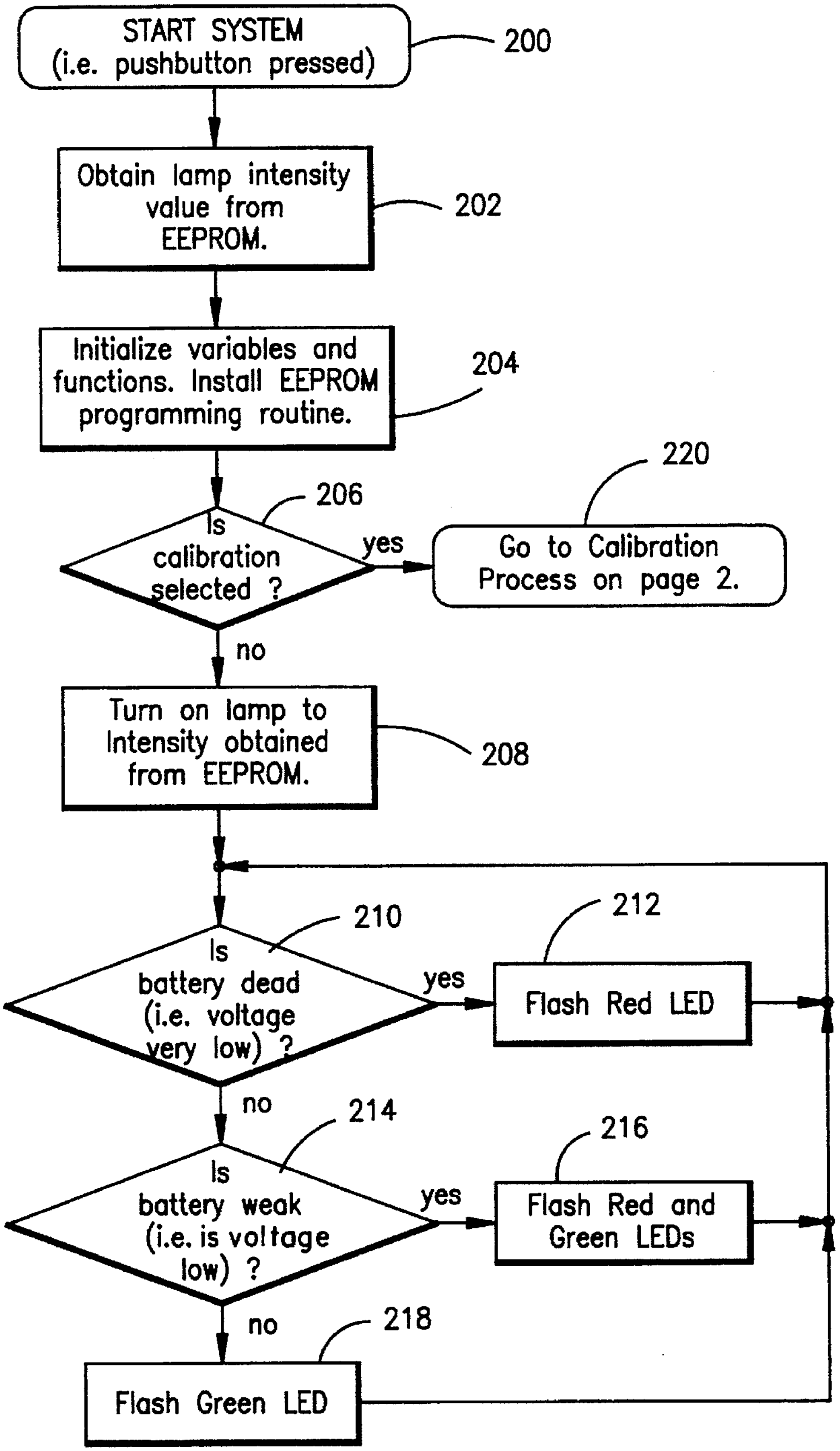
FIGS. 5A–5C are portions of a flow chart illustrating a program carried out by the software of the microprocessor to calibrate and operate the source unit, and check the voltage level of the unit's battery.
Figure 5B:
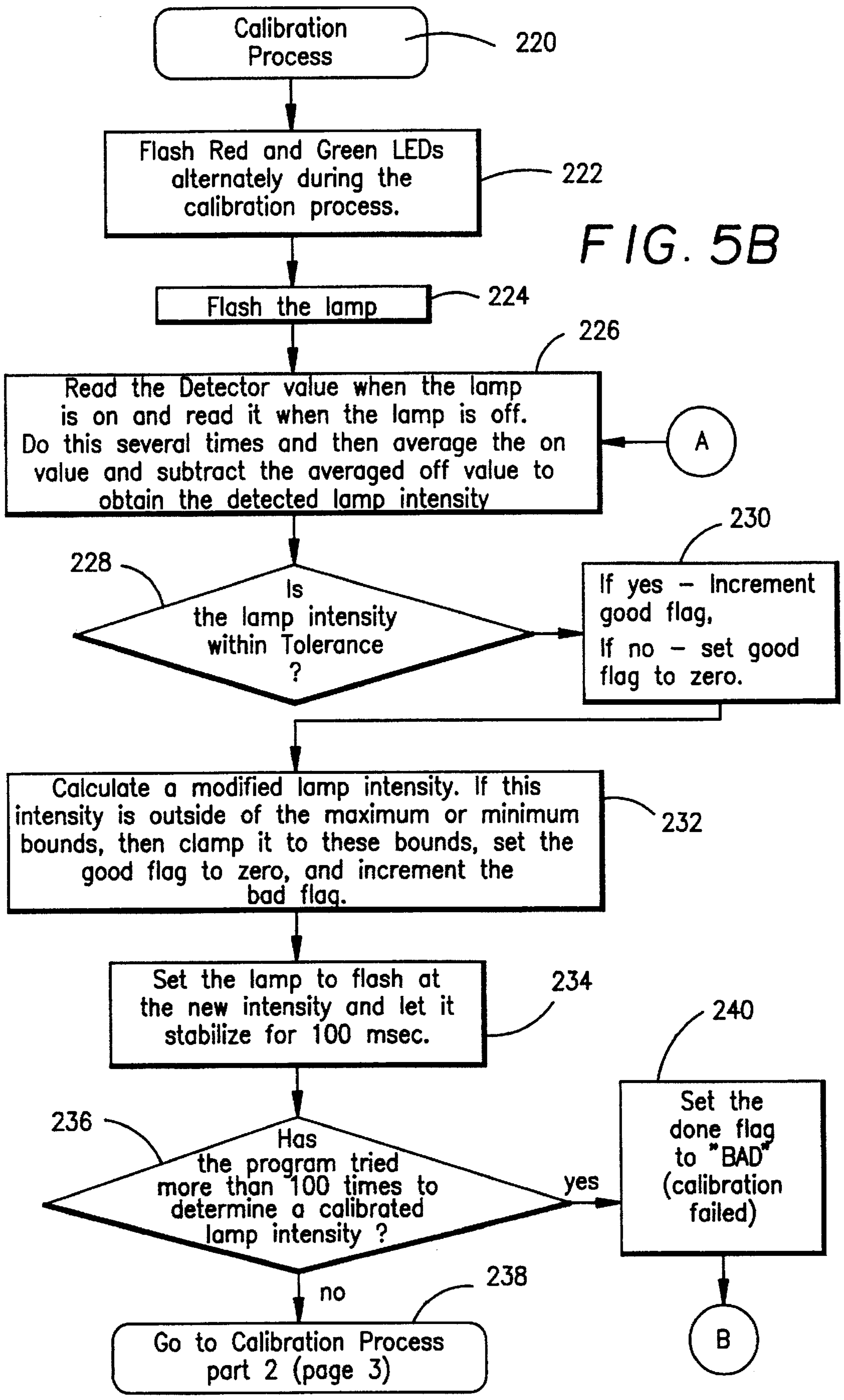
Figure 5C:
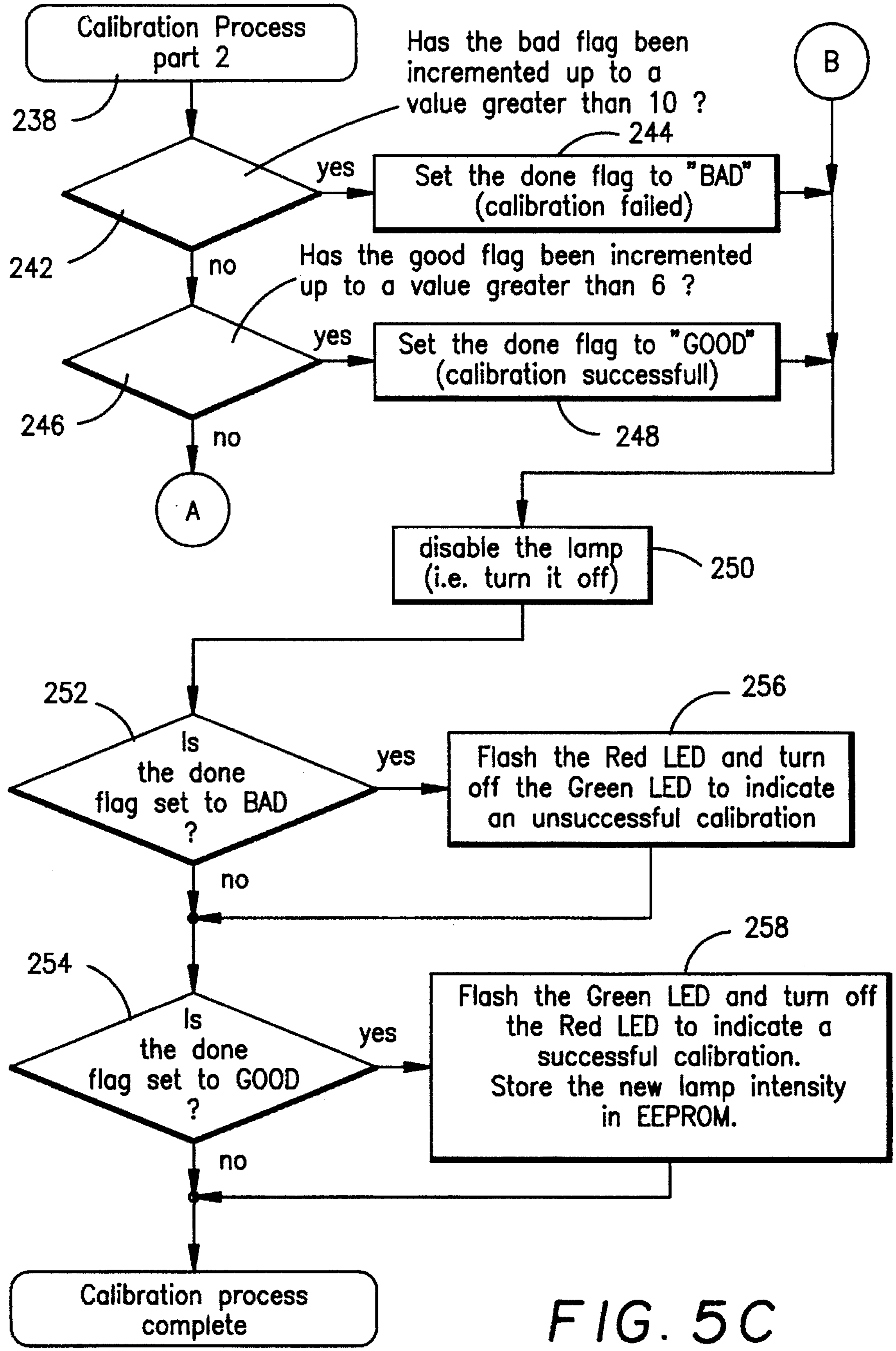

Turning now to FIGS. 5A–5C, a flow chart illustrating steps carried out by the microprocessor 60 during the calibration and battery checking operations of the unit 10 is shown. The program implemented by the microprocessor 60 to carry out these steps which is written in "C" programming language is provided in the attached Appendix.

Beginning first with FIG. 5A, the operator starts operation of the unit 10 at step 200 by depressing the push button 50. At step 202, the program obtains the lamp intensity value which is stored in an EEPROM in the microprocessor 60. Next, at step 204, variables and functions are initialized, and the EEPROM programming routine is installed.

The program next determines at step 206 if the operator has rotated the disk 27 to the calibration position to select the calibration mode. If calibration has not been selected, the microprocessor 60 goes to step 208 and turns on the lamp 14 to the intensity obtained from the EEPROM. Next at step 210, the microprocessor 60 checks to see if the battery 64 is dead, i.e., checks to see if its voltage is very low. If it is, the program goes to step 212 and flashes the red LED 48. If the battery voltage is not very low, the program goes to step 214 and determines if the battery is weak, i.e., checks to see if its voltage is low. If it is, the program goes to step 216 and flashes both the green and red LEDs 46 and 48. If the battery passes both tests, the program goes to step 218 and flashes only the green LED 46 which indicates to the operator that the battery is fine. As indicated by the arrows leading from steps 212, 216 and 218 back to step 210, this battery checking procedure is continually repeated during operation of the unit 10.

Turning now to FIG. 5B, the first part of the calibration process is illustrated. If the operator selects calibration in step 206, the program goes to the calibration process at step 220. During the calibration process as illustrated by steps 222 and 224, the green and red LEDs 46 and 48 are flashed alternately, and the lamp 14 is also flashed. At step 226, the program reads the value from the photodetector 17 both when the lamp 14 is on and when it is off. This is done several times, and then the averaged "off" value is subtracted from the averaged "on" value to obtain the detected lamp intensity.

Next, the program goes to steps 228 and 230, and checks to see if the lamp intensity is within a range of tolerance values stored in the EEPROM. If the intensity is within the range, a "lamp good" flag is incremented. If the lamp intensity is not within the stored range of tolerance values, the good flag is set to zero.

At step 232, the program calculates a modified lamp intensity that is necessary to maintain the intensity within the range of tolerance values. If this intensity is outside of the maximum or minimum bounds, the intensity is clamped to these bounds, the good flag is set to zero, and a "lamp bad" flag is incremented.

Now at step 234, the lamp is flashed at the new intensity and is allowed to stabilize for 100 msec. The program then inquires at step 236 if the program has tried more than 100 times to determine a calibrated lamp intensity. If it has not, the program goes to part two of the calibration process at step 238. If it has, the done flag is set to "BAD" at step 240 which indicates that the calibration has failed. The program then advances to location B of part two of the calibration process illustrated in FIG. 5C.

Turning now to FIG. 5C, the program continues the calibration process by inquiring at step 242 if the bad flag has been incremented up to a value greater than 10. If it has, the done flag is set to "BAD" at step 244. If not, the program inquires at step 246 if the good flag has been incremented up to a value greater than 6. If it has, the done flag is set to "GOOD" at step 248 indicating that the calibration has been successful. If not, the program returns to location A of the first part of the calibration process, and repeats the process once again to insure that an accurate calibration has been performed. The program therefore requires that the lamp pass the calibration test six times in a row before the calibration is determined to be successful. Also, the lamp will not be determined to have failed the calibration until either the program was tried more than 100 times to determine a calibrated lamp intensity, or the lamp has failed the calibration 10 times. This procedure helps prevent the outcome of the calibration from being effected by spurious readings or signals from the photodetector 17 or the other various circuit elements involved in the calibration procedures.

Once the program has determined whether the calibration is successful or failed, the lamp 14 is turned off at step 250, and the program inquires at steps 252 and 254 whether the done flag is set to "BAD" or "GOOD". If the done flag is set to "BAD", the program goes to step 256, flashes the red LED 48 and turns off the green LED 46 to indicate an unsuccessful calibration. If the done flag is set to "GOOD", the program goes to step 258, flashes the green LED 46 and turns off the red LED 48 to indicate a successful calibration. In addition, the new lamp intensity is stored in the EEPROM, and the calibration process is completed.

In summary, the present invention provides a portable device for testing the performance of fire detectors which provides a convenient means for both adjusting and calibrating the intensity of its light source so that it can be employed to test detectors of different types and at various distances accurately and dependably. Although the present invention has been described in terms of a preferred embodiment, it will be understood that numerous modifications and variations could be made thereto without departing from the scope of the invention as set forth in the following claims. For example, although a preferred embodiment of the invention has been described as being particularly suited for simulating hydrogen fires, it will be understood that the unit 10 can be easily designed to simulate other types of fires by changing the lamp 14 to one having a different wavelength spectrum. Further, it will be understood that the unit 10 can be employed for testing the operation of any type of radiation responsive detector, and is thus not limited for use in testing only fire detectors.

What is claimed is:

1. A portable light source device comprising:

a) a housing;

b) a light source disposed in said housing;

c) a battery power supply disposed in said housing for powering said light source;

d) a switch for connecting said power supply to said light source;

e) an aperture in said housing for emitting radiation from said light source, said aperture having a diameter; and f) means for adjusting the size of said aperture diameter to one of a plurality of discrete sizes;

whereby, the intensity of the radiation emitted from said housing is adjustable by adjusting the size of said aperture diameter.

2. The device of claim 1, wherein said means for adjusting the size of said aperture comprises:

(i) a rotatable aperture disk mounted in said housing, said aperture disk being divided into a plurality of sectors, each of which is positionable in said housing aperture to block at least a portion of radiation emitted by said light source to prevent it from being emitted from said housing; and (ii) a plurality of different sized disk apertures, formed, one each, in at least two of said sectors for controlling the amount of radiation emitted from said housing by said light source.

3. The device of claim 2, further comprising means for calibrating said light source to maintain the intensity of radiation emitted thereby within a preselected range of intensity levels.

4. The device of claim 3, wherein one of said sectors is a calibration sector of said aperture disk having no disk aperture formed therein, and is positionable in said housing aperture to completely block all radiation emitted by said light source so that said light source can be calibrated.

5. The device of claim 4, further including means responsive to the positioning of said calibration sector in said housing aperture for initiating a calibration procedure for said light source to maintain the intensity of radiation emitted thereby within a preselected range of intensity levels.

6. The device of claim 5, wherein said means for calibrating further comprises:

(i) a photodetector positioned in said housing for sensing the intensity of radiation emitted by said light source and generating an electrical output signal proportional to said intensity; and (ii) a microprocessor circuit responsive to said photodetector output signal for adjusting the current supplied to said light source from said power supply to maintain the intensity of the radiation emitted by said light source within a range of values stored in a memory in said microprocessor circuit.

7. The device of claim 6, further including indicator means disposed on said housing for indicating whether said microprocessor circuit successfully calibrates said light source during said calibration procedure.

8. The device of claim 6, wherein said microprocessor circuit further includes means for testing the intensity of said light source a plurality of times before determining whether said light source passes the calibration procedure.

9. The device of claim 1, further including:

(i) battery condition sensing means disposed in said housing for determining whether said battery is good, weak or dead; and (ii) indicator means disposed on said housing for indicating whether said battery is good, weak or dead.

10. The device of claim 2, further comprising:

(i) a window disposed in said housing aperture for forming a sealed portion of said housing containing said light source, said window being disposed between said light source and said rotatable aperture disk; and (ii) a short focal length lens disposed at an exterior end of said housing aperture, said rotatable disk being positioned between said lens and said window in said housing aperture.

11. The device of claim 10, wherein said window and said lens are made from sapphire.

12. The device of claim 1, wherein said housing includes a removable end cap containing said aperture, and said device further includes a microswitch disposed in said housing which disconnects said power supply when said end cap is removed to disable said power supply and eliminate the risk of electric shock to an operator servicing said device.

13. A portable light source device comprising:

(a) a housing;

(b) a light source disposed in said housing;

(c) a battery power supply disposed in said housing for powering said light source;

(d) switch means for connecting said power supply to said light source;

(e) an aperture formed in said housing for emitting radiation from said light source; and (f) means for calibrating said light source to maintain the intensity of the radiation emitted thereby within a preselected range of intensity levels.

14. The device of claim 13, wherein said means for calibrating further comprises:

(i) a photodetector positioned in said housing for sensing the intensity of radiation emitted by said light source and generating an electrical output signal proportional to said intensity; and (ii) a microprocessor circuit responsive to said photodetector output signal for adjusting the current supplied to said light source from said power supply to maintain the intensity of the radiation emitted by said light source within a range of values stored in a memory in said microprocessor circuit.

15. The device of claim 13, further including means for setting the size of said aperture comprising:

(i) a rotatable aperture disk mounted in said housing, said aperture disk being divided into a plurality of sectors, each of which is positionable in said housing aperture to block at least a portion of radiation emitted by said light source to prevent it from being emitted from said housing; and (ii) a plurality of different sized disk apertures, formed, one each, in at least two of said sectors for controlling the amount of radiation emitted from said housing by said light source.

16. The device of claim 15, wherein one of said sectors is a calibration sector of said aperture disk having no disk aperture formed therein, and is positionable in said housing aperture to completely block all radiation emitted by said light source so that said light source can be calibrated.

17. The device of claim 16, further including means responsive to the positioning of said calibration sector in said housing aperture for causing said calibration means to initiate a calibration procedure for said light source.

18. The device of claim 13, further comprising indicator means disposed on said housing for indicating whether a calibration procedure performed by said calibration means is successful or not.

19. The device of claim 18, further comprising means for determining whether the condition of said power supply is good, weak or bad, and means for causing said indicator means to indicate whether said power supply is good, weak or bad.

20. The device of claim 14, wherein said microprocessor circuit further includes means for testing the intensity of said light source a plurality of times before determining whether said light source can be calibrated.

* * * * *